Patented Oct. 27, 1925.

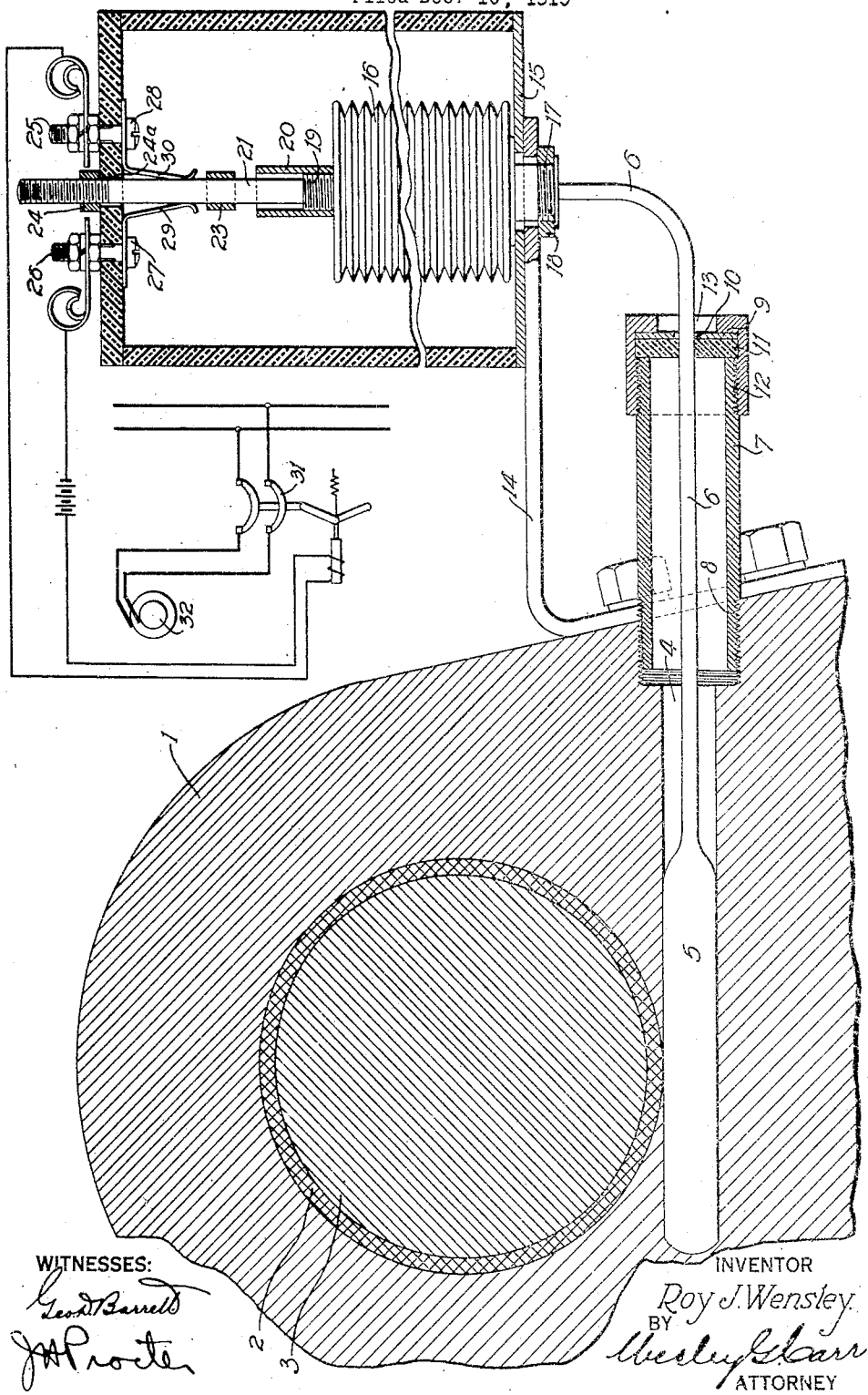

1,559,022

UNITED STATES PATENT OFFICE.

ROY J. WENSLEY, OF EDGEWOOD PARK, PENNSYLVANIA, ASSIGNOR TO WESTING-HOUSE ELECTRIC & MANUFACTURING COMPANY, A CORPORATION OF PENNSYLVANIA.

THERMOSTAT.

Application filed December 10, 1919. Serial No. 343,977.

*To all whom it may concern:*

Be it known that I, ROY J. WENSLEY, a citizen of the United States, and a resident of Edgewood Park, in the county of Allegheny and State of Pennsylvania, have invented a new and useful Improvement in Thermostats, of which the following is a specification.

My invention relates to protective thermostats and it has special relation to thermostats employed for protecting machine parts.

More particularly, my invention relates to means for protecting the bearings of electrical machinery, such as generators and motors, although I wish it expressly understood that its use is not limited to this class of machinery but is applicable to the protection of all machine parts where friction occurs.

In the past, as a rule, it was difficult to determine when a bearing became overheated and, in many instances, the heating reached such a high degree of temperature that the bearing metal started to flow, thus ruining the bearing. This condition often obtained even though the machinery was in charge of an attendant, and, in cases where the machines were inspected only at infrequent intervals, great damage and even wrecking of the plant might occur, because of the continued running of a machine after the bearing metal had been melted. To afford exemption from damage of this kind, as a result of the overheating of bearing surfaces, this invention was conceived.

An object of my invention is to provide means for cutting off the power from rotating machinery when the bearings start to overheat, and it is especially applicable for providing a sure and automatic means for shutting down an automatic substation when the bearings of the rotary converter or motor-generator set become overheated.

With these and other objects in view, the invention consists in the parts and the combinations thereof hereinafter set forth and claimed, with the understanding that the several necessary elements constituting the same may be varied in proportions and arrangement without departing from the spirit and scope of the invention.

In order to make the invention more clearly understood, I show, in the accompanying drawings, means for carrying the same into practical effect, without limiting the improvements in their useful applications to the particular constructions which, for the purpose of explanation, have been made the subject of illustration.

The single feature of the drawings is a cross sectional view of an embodiment of the invention.

In the drawings, a bearing 1 is lined with Babbitt or other suitable bearing metal 2 in which a shaft 3 is adapted to turn. In close proximity to the lining 2 and inserted in an opening 4 in the housing of the bearing 1, is a thermally conductive bulb 5 of metal or any other suitable material, filled or partially filled with a volatile fluid, not indicated in the drawings.

A tube 6 extends upwardly from the bulb 5 and is protected from injury, over a portion of its length in proximity to the bearing 1, by a support 7 in the form of a hollow metal member, screwed, at 8, into the housing of the bearing 1. A metal cap 9, that is provided with an aperture 10 through which the tube 6 projects, is disposed at the end of the support 7 remote from the bearing 1. To ensure a close fit, the inner surface of the cap 9 is provided with a disk of cork or other suitable packing material, as indicated at 11. To hold the cap 9 and the cork disk 11 in place, the support 7 is screw-threaded at the end upon which the cap 9 is disposed and a screw-threaded cap 12, having a central aperture 13 for the passage of the tube 6 therethrough, is screwed over the first mentioned cap.

A bent metal rod 14 is bolted to the housing of the bearing 1 and supports a housing 15 adjacent to the upper end of its vertical portion, within which are contained a metallic bellows and a circuit-breaking device. The bellows 16 is provided with a neck 17 which projects through the side of the housing 15 and through a suitably provided aperture formed in the support 14. The outer end of the neck 17 is screw threaded to receive a screw-cap 18 through which the tube 6 communicates with the bellows, and which firmly clamps the support 14 and the bellows 16 to the housing 15.

A projection 19 is disposed on the end of the bellows opposite the neck 17, and an insulating tube 20 is screw threaded to such projection to serve as a guide for an insulating rod 21. The rod 21 engages the end of the projection 19 but is not secured thereto, thereby providing a lost-motion connection with the rod when the bellows is contracting and when the rod is held in position, as hereinafter set forth. On the rod 21 and within the housing 15 is located a collar 23 of any suitable conducting material. One end of the rod 21 projects through an annular aperture 24a in the end of the housing and is provided with a collar 24, to limit the degree of movement of the rod inwardly. The aperture 24a is of sufficient size to permit the interior of the housing 15 to remain constantly at atmospheric pressure.

Two binding posts 25 and 26 are mounted in the end of the housing 15 and are provided with heads 27 and 28, respectively, for clamping spring contact members 29 and 30 in position to effect engagement with the rod 21.

In operation, when the bearing 1 becomes overheated, the volatile liquid in the bulb 5 is partially vaporized and produces a vapor pressure in the tube 6 that is communicated to the metallic bellows 16, thus causing it to expand. As a consequence, the rod 21 is moved against the frictional contact of the spring contact members 29 and 30. If the temperature of the bearing rises high enough to be dangerous to the machine, the collar 23 on the rod 21 will be forced between the spring contact members 29 and 30 by means of the extension 19 pressing against the end of the rod 21, and a circuit through the collar 23 will be completed to cause an electro-magnetically controlled circuit interrupter 31, of the usual type, to open and thereby disconnect all power from the machine 32. It will be apparent that it is impossible to again start the machine, even after the temperature of the overheated parts has fallen to normal, without resetting the thermal protector by hand.

As the rod 21 is not connected to the projection 19, the pressure of the spring contact members on the collar 23 is sufficient to prevent the rod from returning to its original position, after the vapor pressure has again fallen to normal. To permit the machine to be again set in motion, it is necessary to press the rod inwardly to disconnect the collar 23 from the contact members 39 and 30 before the interrupter 31 is closed.

Although I have shown and described my invention as applied to a specific structure, such as a bearing-protecting thermostat, it is evident that it may be applied to many other types of apparatus, and that various modification may be made therein without departing from the spirit and scope of the appended claims.

I claim as my invention:

1. A thermal protective device for machine parts comprising a bulb containing a volatile fluid, a bellows connected with the bulb, and responsive only to the volatilized fluid, an insulating rod operable by said bellows, contact members bearing against said rod, and means on the rod for completing an electrical circuit through the contact members.

2. A thermal protective device for bearings comprising a bulb containing a volatile fluid, a bellows connected with the bulb and responsive only to the volatilized fluid, an insulating rod operable by said bellows, contact members bearing against said rod, and a collar on said rod adapted to be forced between said contact members to complete the electrical circuit through the contact members.

In testimony whereof, I have hereunto subscribed my name this 29th day of November, 1919.

ROY J. WENSLEY.